（12）United States Patent
Sakaguchi

(10) Patent No.: US 10,891,092 B2
(45) Date of Patent: Jan. 12, 2021

(54) IMAGE PROCESSING APPARATUS, CONTROL METHOD THEREFOR, AND STORAGE MEDIUM TO PRESENT A SETTING CONTENT

(71) Applicant: CANON KABUSHIKI KAISHA, Tokyo (JP)

(72) Inventor: Toru Sakaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,781

(22) Filed: May 21, 2019

(65) Prior Publication Data

US 2019/0384552 A1 Dec. 19, 2019

(30) Foreign Application Priority Data

Jun. 19, 2018 (JP) .................................. 2018-116496

(51) Int. Cl.
*G06F 3/12* (2006.01)
*H04N 1/00* (2006.01)

(52) U.S. Cl.
CPC .......... *G06F 3/1257* (2013.01); *G06F 3/1204* (2013.01); *G06F 3/1205* (2013.01); *G06F 3/1254* (2013.01); *G06F 3/1273* (2013.01); *H04N 1/00389* (2013.01); *G06F 3/1285* (2013.01)

(58) Field of Classification Search
CPC ................ G06F 3/1254; G06F 3/1257; H04N 1/0035–00517
See application file for complete search history.

(56) References Cited

U.S. PATENT DOCUMENTS

| 2008/0046467 A1* | 2/2008 | Nakajima | G06F 12/1458 |
| 2008/0278749 A1* | 11/2008 | Sato | H04N 1/00482 |
| | | | 358/1.15 |
| 2009/0195819 A1* | 8/2009 | Sugimoto | H04N 1/00413 |
| | | | 358/1.15 |
| 2010/0079377 A1* | 4/2010 | Katsura | G06F 3/0482 |
| | | | 345/168 |
| 2010/0157362 A1* | 6/2010 | Oomura | G06F 3/1204 |
| | | | 358/1.15 |
| 2011/0299106 A1* | 12/2011 | Mori | G06F 3/1205 |
| | | | 358/1.9 |
| 2012/0162691 A1* | 6/2012 | Maeda | H04N 1/00411 |
| | | | 358/1.14 |
| 2012/0218589 A1* | 8/2012 | Watanabe | G06F 3/1205 |
| | | | 358/1.15 |

(Continued)

FOREIGN PATENT DOCUMENTS

JP 2010-201931 A 9/2010

*Primary Examiner* — Nicholas Pachol
(74) *Attorney, Agent, or Firm* — Canon U.S.A., Inc. IP Division

(57) ABSTRACT

In an image processing apparatus, in a case where a mode for executing, by pressing a second software key, a function based on a setting content of the second software key without displaying a first screen with which a setting content of an application is changeable is set and a setting content identical to the setting content displayed on the pressed second software key is displayed on a third software key, a second screen that enables a user to check the setting content corresponding to the second software key is displayed.

11 Claims, 17 Drawing Sheets

(56) References Cited

U.S. PATENT DOCUMENTS

| | | | | |
|---|---|---|---|---|
| 2013/0044341 A1* | 2/2013 | Uchino | ............... | G06F 3/0486 |
| | | | | 358/1.13 |
| 2013/0050731 A1* | 2/2013 | Fukuoh | ............... | G06F 3/1258 |
| | | | | 358/1.13 |
| 2015/0222770 A1* | 8/2015 | Yoshida | ............ | H04N 1/00517 |
| | | | | 358/1.15 |
| 2018/0024793 A1* | 1/2018 | Nomura | ............ | H04N 1/00411 |
| | | | | 358/1.14 |
| 2018/0314474 A1* | 11/2018 | Nakaya | ............... | G06F 3/1238 |
| 2018/0373481 A1* | 12/2018 | Kobayashi | ............ | G06F 3/1285 |

* cited by examiner

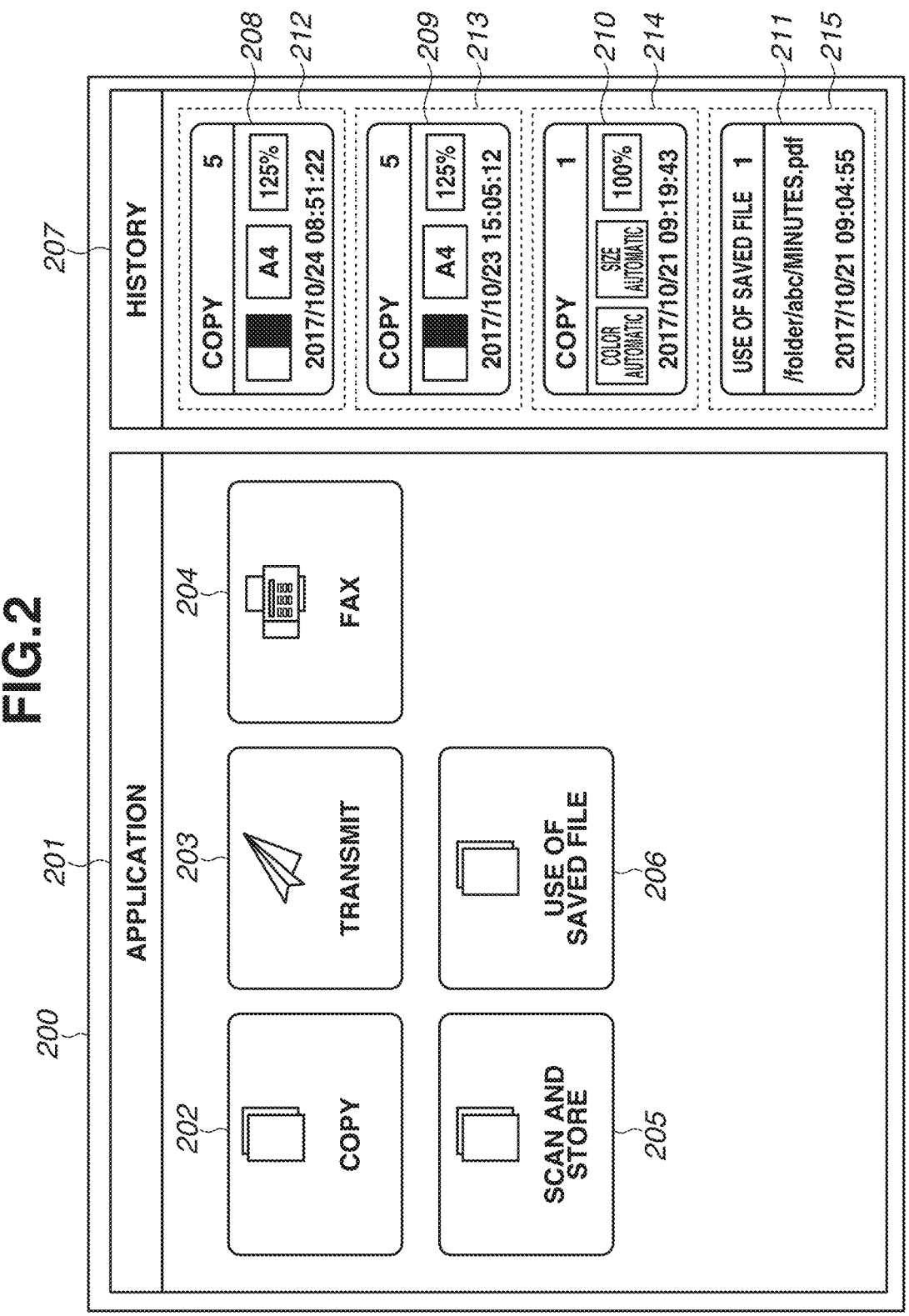

FIG.3

| HISTORY ID | APPLICATION TYPE | PREVIOUS EXECUTION DATE/TIME | SETTING CONTENTS |
|---|---|---|---|
| 1 | COPY | 2017/10/24 08:51:22 | NUMBER OF COPIES/5<br>COLOR MODE/BLACK-AND-WHITE<br>SHEET SIZE/A4<br>MAGNIFICATION/125%<br>PRINT SURFACE/DOUBLE-SIDED TO DOUBLE-SIDED<br>N-IN-ONE PRINTING/1 in 1<br>DENSITY/NORMAL<br>STAPLING/NOT STAPLED |
| 2 | COPY | 2017/10/23 15:05:12 | NUMBER OF COPIES/5<br>COLOR MODE/BLACK-AND-WHITE<br>SHEET SIZE/A4<br>MAGNIFICATION/125%<br>PRINT SURFACE/SINGLE-SIDED TO SINGLE-SIDED<br>N-IN-ONE PRINTING/2 in 1<br>DENSITY/NORMAL<br>STAPLING/NOT STAPLED |
| 3 | COPY | 2017/10/21 09:19:43 | NUMBER OF COPIES/1<br>COLOR MODE/AUTOMATIC<br>SHEET SIZE/AUTOMATIC<br>MAGNIFICATION/100%<br>PRINT SURFACE/SINGLE-SIDED TO DOUBLE-SIDED<br>N-IN-ONE PRINTING/1 in 1<br>DENSITY/DENSE<br>STAPLING/NOT STAPLED |
| 4 | USE OF SAVED FILE | 2017/10/21 09:04:55 | NUMBER OF COPIES/1<br>FOLDER PATH/"/folder/abc/"<br>FILE NAME/MINUTES.pdf<br>COLOR MODE/COLOR<br>SHEET SIZE/A4<br>MAGNIFICATION/100%<br>PRINT SURFACE/DOUBLE-SIDED OUTPUT<br>DENSITY/NORMAL |
| 5 | COPY | 2017/10/19 16:46:58 | NUMBER OF COPIES/6<br>COLOR MODE/AUTOMATIC<br>SHEET SIZE/B5<br>MAGNIFICATION/AUTOMATIC<br>PRINT SURFACE/SINGLE-SIDED TO DOUBLE-SIDED<br>N-IN-ONE PRINTING/1 in 1<br>DENSITY/DENSE<br>STAPLING/STAPLED |
| 6 | USE OF SAVED FILE | 2017/10/17 12:23:05 | NUMBER OF COPIES/1<br>FOLDER PATH/"/folder/abc/"<br>FILE NAME/MINUTES.pdf<br>COLOR MODE/BLACK-AND-WHITE<br>SHEET SIZE/B5<br>MAGNIFICATION/125%<br>PRINT SURFACE/DOUBLE-SIDED OUTPUT<br>DENSITY/NORMAL |

FIG.6

| DETAILS CHECK | COPY | | |
|---|---|---|---|
| NUMBER OF COPIES | 5 | PRINT SURFACE | DOUBLE-SIDED TO DOUBLE-SIDED |
| COLOR MODE | BLACK-AND-WHITE | N-IN-ONE PRINTING | 1 in 1 |
| SHEET SIZE | A4 | DENSITY | NORMAL |
| MAGNIFICATION | 125% | STAPLING | NOT STAPLED |

602 — EXECUTE    CANCEL — 603

FIG.10

| NUMBER OF COPIES | 1 | PRINT SURFACE | SINGLE-SIDED TO SINGLE-SIDED |
|---|---|---|---|
| COLOR MODE | AUTOMATIC | N-IN-ONE PRINTING | 1 in 1 |
| SHEET SIZE | AUTOMATIC | DENSITY | NORMAL |
| MAGNIFICATION | 100% | STAPLING | NOT STAPLED |

| DETAILS CHECK | COPY | | |
|---|---|---|---|
| NUMBER OF COPIES | 5 | PRINT SURFACE | DOUBLE-SIDED TO DOUBLE-SIDED |
| COLOR MODE | BLACK-AND-WHITE | N-IN-ONE PRINTING | 1 in 1 |
| SHEET SIZE | A4 | DENSITY | NORMAL |
| MAGNIFICATION | 125% | STAPLING | NOT STAPLED |

1204

☑ THIS SCREEN IS NOT DISPLAYED AGAIN WHEN THIS HISTORY BUTTON IS PRESSED.

601

1202 — EXECUTE          CANCEL — 1203

IMAGE PROCESSING APPARATUS, CONTROL METHOD THEREFOR, AND STORAGE MEDIUM TO PRESENT A SETTING CONTENT

BACKGROUND

Field of the Disclosure

The present disclosure generally relates to image processing and, more particularly, to an image processing apparatus, a control method therefor, and a storage medium.

Description of the Related Art

In a case where a user executes specific processing, e.g., print processing, on an image processing apparatus, such as a multi-function peripheral (MFP), the user makes various print settings for items such as a sheet size, the number of copies, and monochrome printing. In the case of an image processing apparatus which is assumed to be used by a plurality of users, a print setting that is changed once is reset after a lapse of a predetermined period so that print processing based on the print setting that is changed from a default print setting by a user A is prevented from being erroneously executed by another user B, and then the print setting is returned to the default print setting. In other words, even if the user A wishes to execute print processing based on the same print setting as the previous print setting, the user A needs to set a desired print setting again, which is not convenient for the user A.

On the other hand, Japanese Patent Application Laid-Open No. 2010-201931 discusses a job processing apparatus (image forming apparatus) having a configuration in which a plurality of settings for executing a job is stored as a setting history so that an operator can reuse a desired setting by selecting the setting history.

SUMMARY

According to an aspect of the present disclosure, an image processing apparatus holds a plurality of applications for using functions of the image processing apparatus and arranges a first software key for activating one of the plurality of applications in a first area displayed on an operation unit of the image processing apparatus, the operation unit being configured to display a second area in which at least a second software key and a third software key for reusing a setting content of the application preliminarily used are arranged. The image processing apparatus includes a setting unit configured to set a mode for executing, by pressing the second software key, a function based on a setting content of the pressed second software key, without displaying a first screen with which the setting content of the application is changeable. In a case where the mode is set by the setting unit and a setting content identical to the setting content displayed on the pressed second software key is displayed on the third software key, a second screen configured to check a setting content corresponding to the pressed second software key is displayed.

Further features of the present disclosure will become apparent from the following description of exemplary embodiments with reference to the attached drawings.

BRIEF DESCRIPTION OF THE DRAWINGS

FIG. 2 illustrates an example of a home screen.

FIG. 3 illustrates an example of history information.

FIG. 6 illustrates an example of a details check screen.

FIG. 10 illustrates an example of default settings of setting values.

FIG. 12 illustrates an example of the details check screen including a checkbox.

DESCRIPTION OF THE EMBODIMENTS

In order to select a setting history in Japanese Patent Application Laid-Open No. 2010-201931, a user needs to operate an operation unit of a multi-function peripheral (MFP) to go back to a screen (history information display screen) on which the setting history is displayed, which is troublesome for the user.

Accordingly, it is conceivable that a method is employed in which a home screen (top screen) to be displayed on a display of the MFP is provided with a history display area and the setting history is constantly displayed as a software key (e.g., a history button). With this method, the user can select the history button on the home screen as if the user has selected an application software key (e.g., an icon), so that the user can effectively reuse the setting for the job that has once been executed. It is also conceivable that a method is employed in which a job is executed immediately after the history button is pressed (this method is hereinafter referred to as a skip mode) so as to reduce the time and labor for re-executing the job.

However, since icons and the like for executing applications are displayed on the home screen of the MFP, the area in which the history button is displayed is limited to a part of the area on the home screen. As a result, the amount of information to be displayed on each history button is also limited. As the information to be displayed on each history button, some of the print setting contents are displayed on each history button, for example, when the history buttons for print processing are set.

Since the amount of information to be displayed on each history button is limited, a plurality of history buttons that are identical in appearance is generated even when the plurality of history buttons indicates different setting contents. Further, in the case of the skip mode described above, it is unknown whether the selected history button indicates a desired setting until the history button is pressed and a print material is output.

The present disclosure has been made in view of the above-described problems, and the present disclosure is directed to presenting a setting content set by a selected history button to a user when a plurality of history buttons that are identical in appearance is present, under a state where a history button displayed on a home screen is selected and the function corresponding to the history button is executed immediately.

An image processing apparatus used in various exemplary embodiments, features, and aspects of the present disclosure will be described in detail below with reference to the accompanying drawings. The following exemplary embodiments are not intended to limit the disclosure described in the claims, and not all combinations of features described in the exemplary embodiments are necessary for the present disclosure.

<Hardware Configuration of Image Processing Apparatus>

Figure 1:
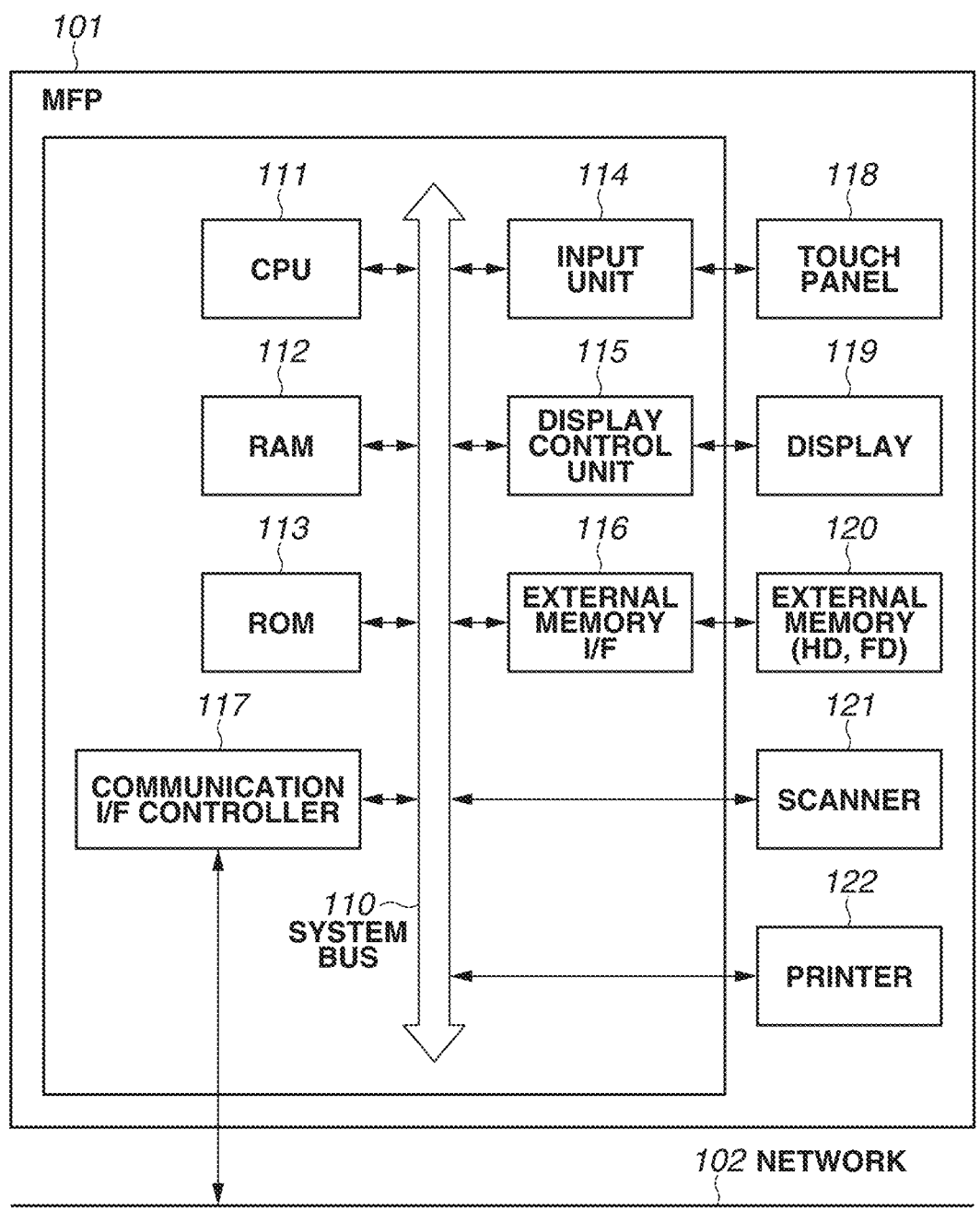
FIG. 1 is a block diagram illustrating an example of a hardware configuration of an image processing apparatus according to a first exemplary embodiment.

FIG. 1 is a block diagram illustrating an example of a hardware configuration of an image processing apparatus according to a first exemplary embodiment. Referring to FIG. 1, a multi-function peripheral (MFP) will be described as an example of the image processing apparatus. An MFP 101 includes a central processing unit (CPU) 111, a random access memory (RAM) 112, a read-only memory (ROM) 113, an input unit 114, a display control unit 115, an external memory interface (I/F) 116, a communication I/F controller 117, a touch panel 118, a display 119, an external memory 120, a scanner 121, and a printer 122. The CPU 111, the RAM 112, the ROM 113, the input unit 114, the display control unit 115, the external memory I/F 116, and the communication I/F controller 117 are connected via a system bus 110. The touch panel 118, the display 119, and the external memory 120 are connected via the system bus 110 so that data can be exchanged via the system bus 110.

The ROM 113 stores image data, other data, and a control program and the like to be executed by the CPU 111. The control program is a program for executing exemplary embodiments to be described below. The ROM 113 includes various types of memories, such as a rewritable flash ROM, and stores setting values set by the user, management data, and the like.

The RAM 112 is a volatile memory, and stores program control variables, buffers and the like for various works, some of setting values set by the user, management data, and the like. The RAM 112 is also used as a temporary storage area such as a main memory or a work area for the CPU 111.

The CPU 111, which may include one or more processors, one or more memories, circuitry, or a combination thereof, may control the MFP 101 by using the RAM 112 as a work memory, for example, based on a program stored in the ROM 113. The program for operating the CPU 111 can be preliminarily stored not only in the ROM 113, but also in the external memory (such as a hard disk) 120. The RAM 112, the ROM 113, and the external memory 120 are collectively referred to as a storage area.

The input unit 114 converts an operation content of a received user operation into a control signal, and supplies the CPU 111 with the control signal. Specifically, the input unit 114 receives the user operation through a keyboard (not illustrated), a mouse (not illustrated), or the touch panel 118, which functions as an input device. The touch panel 118 is an input device that outputs coordinate information, for example, depending on a position at which the user has touched a planar-structured input unit. The CPU 111 can control the MFP 101 based on the control signal acquired through the input unit 114 to perform an operation depending on the user operation.

The display control unit 115 outputs a display signal for causing the display 119 to display an image. For example, the CPU 111 supplies the display control unit 115 with a display control signal that is generated based on a program. The display control unit 115 generates the display signal based on the display control signal, and outputs the display signal to the display 119. For example, the display control unit 115 displays a graphical user interface (GUI) screen, which constitutes a GUI, based on the display control signal generated by the CPU 111.

Further, the display control unit 115 has a function for acquiring an operation position (coordinates) corresponding to the user operation from the user operation (touch operation, flick operation, etc.) detected on the display 119, and specifying the processing corresponding to the user operation, for example, specifying an operated software key.

The touch panel 118 is integrally formed with the display 119, and also functions as an operation unit. For example, a manufacturer produces the touch panel 118 with a structure in which the light transmittance does not interfere with the display of the display 119, and attaches the touch panel 118 to an upper layer of a display surface of the display 119. Further, the manufacturer associates input coordinates on the touch panel 118 with display coordinates on the display 119. As a result, the GUI that enables the user to directly operate a screen displayed on the display 119 is realized.

The external memory I/F 116 is an interface to which the external memory 120 can be attached, such as a hard disk, a solid state drive (SSD), a compact disc (CD), a digital versatile disc (DVD), or a memory card. The external memory I/F 116 reads out data from the external memory 120 and writes data into the external memory 120 under the control of the CPU 111.

The communication I/F controller 117 performs communication via various networks 102, such as a local area network (LAN), the Internet, and wired or wireless networks, under the control of the CPU 111. Various apparatuses such as a personal computer (PC), another MFP, a printer, and a server, can be connected to the networks 102 so that the apparatuses can communicate with the MFP 101.

The scanner 121 scans a document and generates image data. The printer 122 executes print processing based on a user's instruction input through the input unit 114, or a command input from an external apparatus through the communication I/F controller 117. The hardware of the MFP 101 is configured as described above.

<Software Configuration Diagram>

Figure 17:
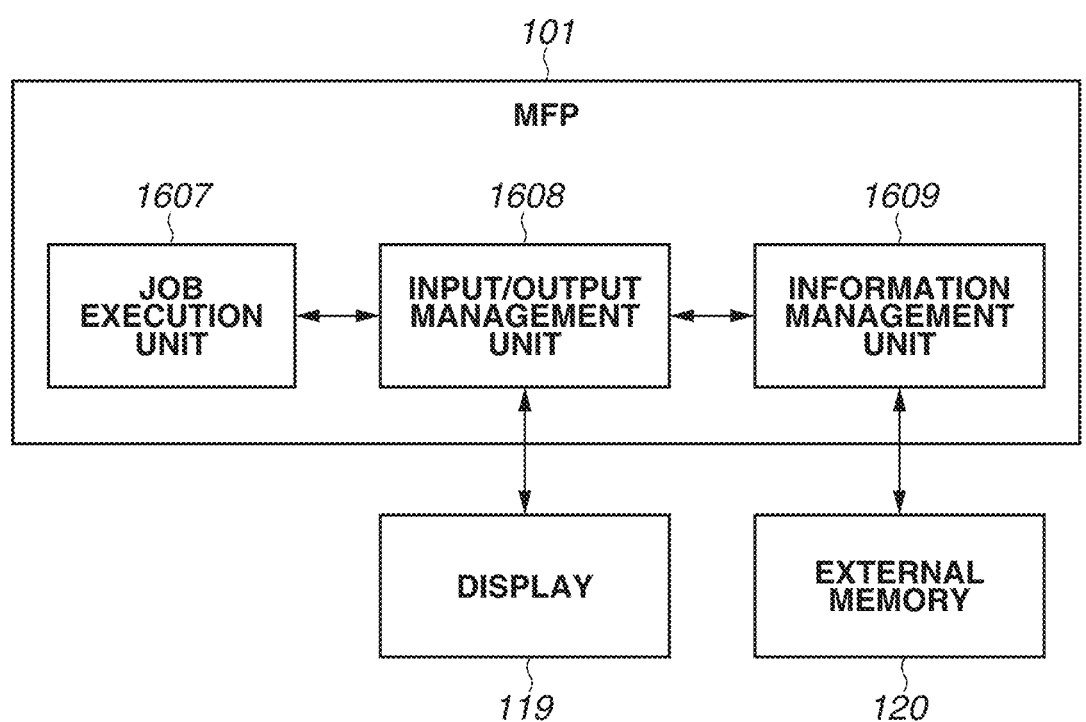
FIG. 17 is a block diagram illustrating an example of a software configuration of the image processing apparatus according to the first exemplary embodiment.

FIG. 17 is a block diagram illustrating a software configuration of the MFP 101. Various functions are executed by the CPU 111 based on application programs stored in the ROM 113.

The MFP 101 includes an input/output management unit 1608, an information management unit 1609, and a job execution unit 1607. The information management unit 1609 is a function for managing information about history buttons displayed on a home screen 200, factory default settings, and various setting values indicating, for example, whether the skip mode is ON. The following exemplary embodiments illustrate an example in which history buttons are set as software keys to be displayed on the home screen of the MFP 101.

The job execution unit 1607 is a function for executing a job based on the setting content corresponding to the pressed history button. Specific examples of the job to be executed here include a print job to be executed when the function set by the selected history button is a print function, a scan job to be executed when the function set by the selected history button is a scan function, and a facsimile (fax) job to be executed when the function set by the selected history button is a fax function.

The input/output management unit 1608 is a function for referring to information managed by the information management unit 1609, or transmitting a job execution instruction to the job execution unit 1607, based on an input signal acquired through the display 119 (or the touch panel 118). The input/output management unit 1608 also controls the display of the display 119 depending on the processing to be executed by the job execution unit 1607.

<Home Screen>

FIG. 2 illustrates an example of the home screen 200 displayed on the display 119 of the MFP 101. The home screen 200 includes application buttons 202 to 206 and history buttons 208 to 211.

An application display area 201 is an area in which the plurality of application buttons 202 to 206 is displayed. Examples of the application buttons include the copy application button 202, the transmit application button 203, the fax application button 204, the scan-and-store application button 205, and the use-of-saved-file application button 206. The application buttons 202 to 206 are buttons for activating the respective applications. When one of the application buttons is pressed by a user operation, the CPU 111 activates the application corresponding to the pressed application button. Specifically, when each application button is pressed, copy processing, fax processing, scan processing, or the like is executed depending on the display of the application button. In addition, the number of application buttons and functions to be executed when each application button is pressed are not particularly limited.

A history display area 207 is an area in which the history buttons 208 to 211 are displayed. FIG. 2 illustrates an example in which the four history buttons 208 to 211 are displayed. When a user's upward flick operation on the history display area 207 is received, the history buttons 208 to 211 are scrolled upward on the home screen 200. By this scroll operation, other history buttons (not illustrated) which have not been displayed in the history display area 207 illustrated in FIG. 2 can be displayed on the home screen 200.

The history buttons 208 to 211 are buttons for re-executing each job stored as a history. The term "job" used herein refers to a unit of processing to be executed by the MFP 101. For example, in the case of a print job, the job is the processing for outputting a print material in a specific print setting.

Each of history button areas 212 to 215 is an area in which the corresponding history button is displayed. Only specific information among history information 300 associated with each history button is displayed. The history information 300 is information including a setting content in a history displayed as each history button, the type of an application, and execution date and time of processing.

In the case of the history button area 215, "use of saved file" is displayed as the type of the job associated with the history button 211, "1" is displayed as the number of copies, "/folder/abc/minutes.pdf" is displayed as the file name of the file stored when the job of "use of saved file" is executed, and "2017/10/21 09:04:55" is displayed as the execution date and time when the job of "use of saved file" has been executed. The file name includes stored text data "minutes.pdf" and a folder path "/folder/abc/" indicating the storage destination of the text data.

In the history button area 214, "copy" is displayed as the type of the job associated with the history button 210, "color automatic, size automatic, (magnification) 100%" is displayed as print settings set when the "copy" job has been executed, and "2017/10/21 09:19:43" is displayed as the execution date and time of the "copy" job.

In this manner, the application name, such as "copy" or "use of saved file", of any one of the application buttons 202 to 206 is described in an upper portion of each history button area, and setting contents are described in a lower portion of each history button.

Figure 15:
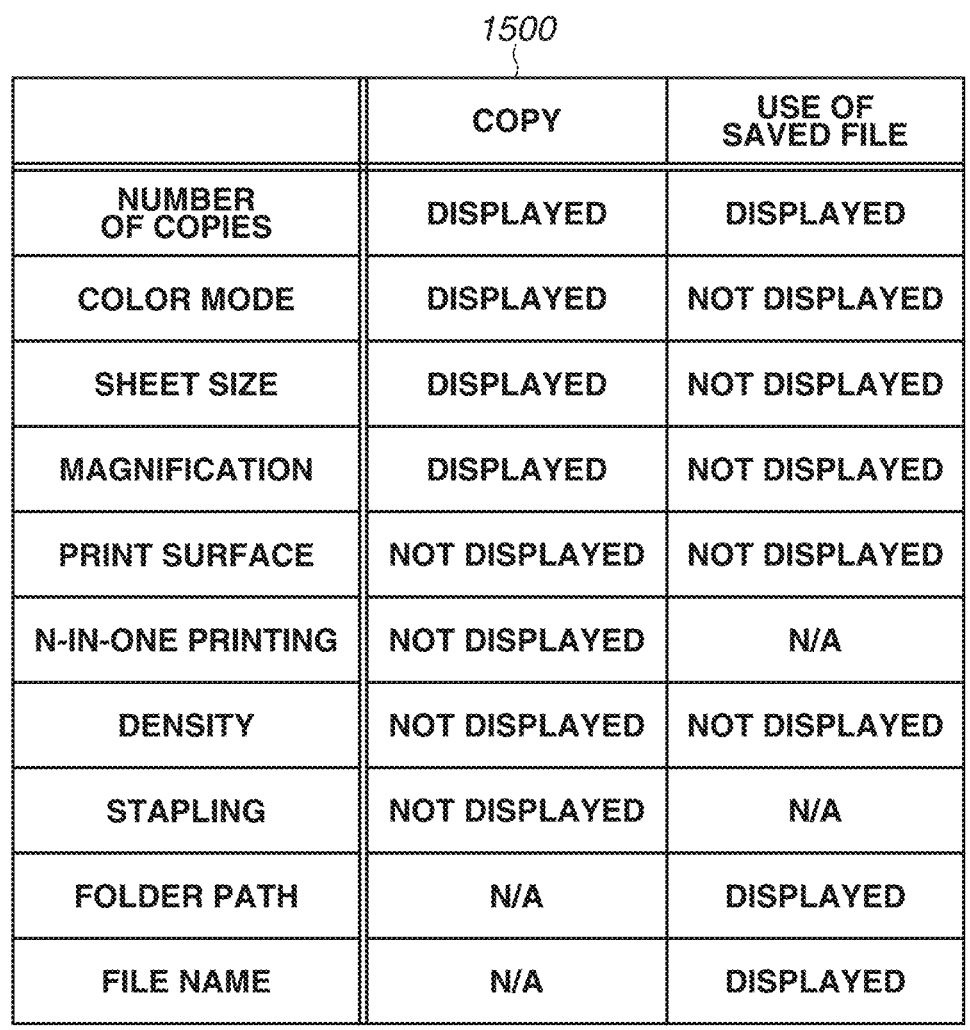
FIG. 15 illustrates an example of a table for managing display and non-display of setting items.

Information to be displayed on the history button areas 212 to 215 is determined with reference to a table 1500 which is illustrated as an example in FIG. 15. The table 1500 is stored in the ROM 113 or the RAM 112. Information to be displayed in each history button area is managed for each type of the applications. For example, in the case of "copy", information to be displayed on the history button area includes "the number of copies", "color mode", "sheet size", and "magnification". In the case of "use of saved file", information to be displayed on the history button area includes "the number of copies", "file path", and "file name". The term "N/A" indicates that the application does not include the corresponding setting item (i.e., unsettable). The type of each application and the execution date and time which are associated with each history button are constantly displayed without managing display or non-display in the table 1500.

Further, when a job is executed, the history button corresponding to the job is automatically generated, and the newly generated history button is disposed in the upper portion of the history display area 207. However, if the history information 300 including setting contents 304 and an application type 302 which are the same as those of the job already executed is present, a previous execution date/time 303 in the existing history information 300 is updated with an execution date and time of a new job, and the history button in which the execution date and time is updated is newly disposed in the upper portion of the history display area 207.

Figure 16:
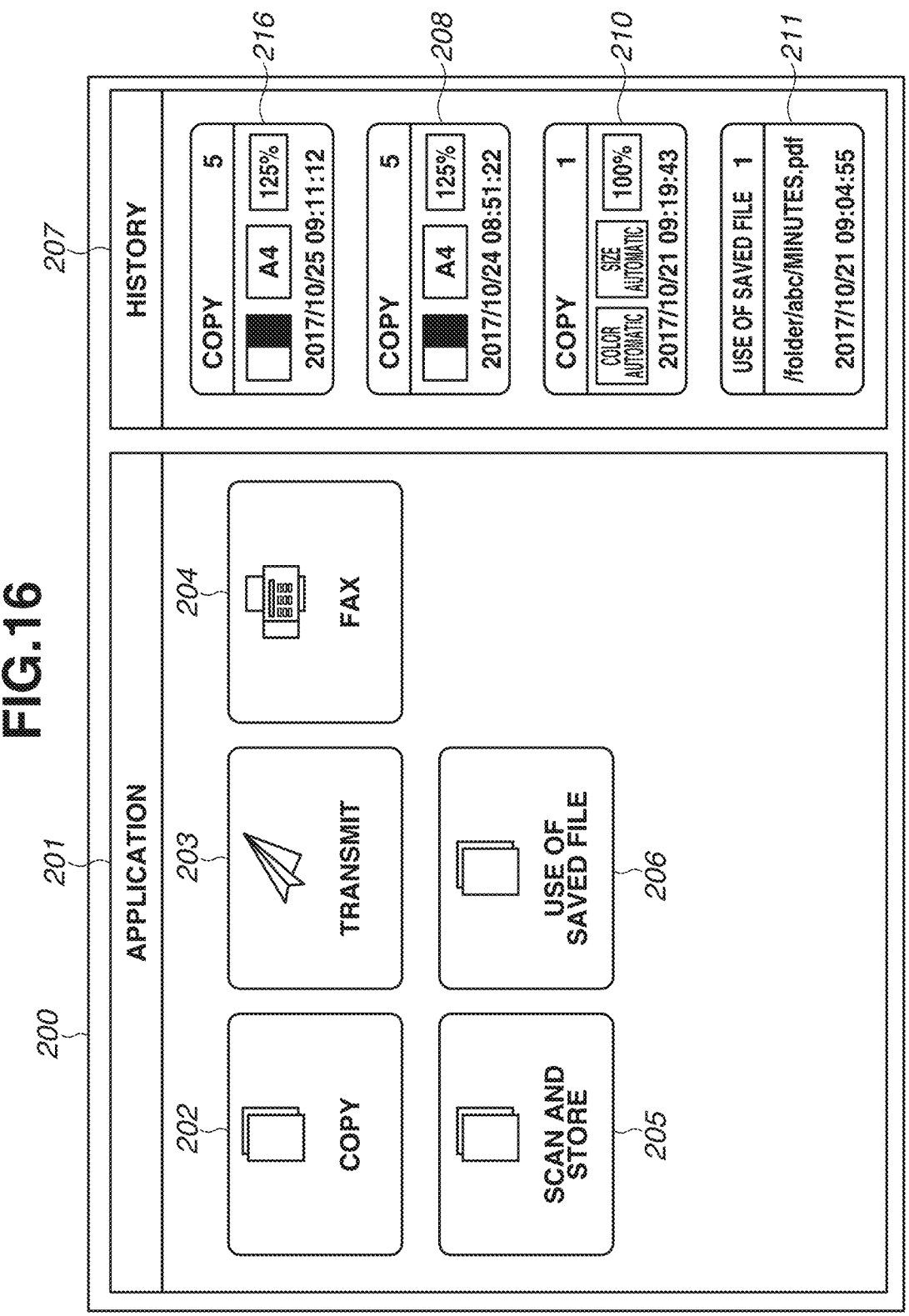
FIG. 16 illustrates an example of the home screen.

For example, when the copy function is executed with the same setting contents as a history identification (ID) "2" on "2017/10/25 09:11:12", the history button 209 is not displayed, and in place of the history button 209, a new history button 216 (FIG. 16) is displayed in the upper portion of the history display area 207. In other words, in the history display area 207, a plurality of history buttons that are identical in appearance can be present, but a plurality of history buttons including the same setting contents 304 and the same application type 302 is not present.

There is an upper limit (four) for the number of the history buttons 208 to 211 that can be displayed in the history display area 207. In the case of adding a new history button to the history buttons 208 to 211, the history button 211 with the oldest execution time and date among the history buttons displayed in the history display area 207 is not displayed. Then, four history buttons including the newly generated history button are displayed in the history display area 207. The home screen 200 is configured as described above.

<History Information>

The history information 300 associated with the history buttons 208 to 211 will be described with reference to FIG. 3. The history information 300 is stored in the ROM 113 or the RAM 112. When any one of the history buttons 208 to 211 is pressed, the history information associated with the pressed history button is called up and the job is re-executed based on the content of the called-up history information.

The history information 300 includes a history ID 301, the application type 302, the previous execution date/time 303, and the setting contents 304. Items other than those illustrated in FIG. 3 may be included in the history information 300, and items to be held may be changed depending on the type of each application.

The history ID 301 represents an ID for uniquely identifying the history. The application type 302 represents the type of each application. The previous execution date/time 303 represents the date and time when the job corresponding to the history information is last executed. The setting contents 304 represent setting contents when the job is executed. For example, the setting contents 304 are described in HashMap format of "KEY/VALUE".

For example, the history information specified by a history ID "1" indicates the "copy" job that is executed on "2017/10/24 08:51:22" and is associated with the history button 208 on the home screen 200. As the setting contents 304, "5" is set as the number of copies, "black-and-white" is set as the color mode, "A4" is set as the sheet size, "125%" is set as the magnification, "double-sided to double-sided" is set as the print surface, "1 in 1" is set as N-in-one printing, "normal" is set as the density, and "not stapled" is set as stapling.

As is obvious from the comparison between the history buttons 208 to 211 (FIG. 2) and the history information 300 (FIG. 3), not all the setting contents corresponding to the respective area buttons are displayed on the history button areas 212 to 215, and information that is displayed in each history button area and information that is not displayed in each history button area are managed by the table 1500 described above. Therefore, the history buttons corresponding to the jobs including different setting contents 304 in the history information 300 can be identical in appearance. The history information has been described above.

<Job Execution Flow in Normal Mode>

Processing to be executed from when any one of the history buttons 208 to 211 is pressed until when a job is executed will be described with reference to FIG. 5. This operation flow is executed in such a manner that the CPU 111 detects that any one of the history buttons 208 to 211 is pressed through the touch panel 118 and controls the program that is related to the record pressing processing and stored in the ROM 113.

In step S501, the input/output management unit 1608 determines whether any one of the history buttons 208 to 211 is pressed. During start-up of the MFP 101, the input/output management unit 1608 repeatedly performs the processing of step S501 at predetermined intervals (e.g., every one second). If it is determined that pressing of any one of the history buttons 208 to 211 is detected (YES in step S501), the processing proceeds to step S502. In the present case, the history button 208 is pressed in step S501.

In step S502, the input/output management unit 1608 refers to the history information 300 managed by the information management unit 1609, and reads out the application type 302 and the setting contents 304 of the history associated with the pressed one of the history buttons 208 to 211. Then, the setting contents 304 are transmitted to the application that matches the read application type 302. In the present case, since it is assumed that the history button 208 is pressed, the setting contents 304 are transmitted to the job execution unit 1607. The setting contents to be transmitted in the present case include "the number of copies/5, color mode/black-and-white sheet, size/A4, magnification/125%, print surface/double-sided to double-sided, N-in-one printing/1 in 1, density/normal, stapling/not stapled".

Figure 4:
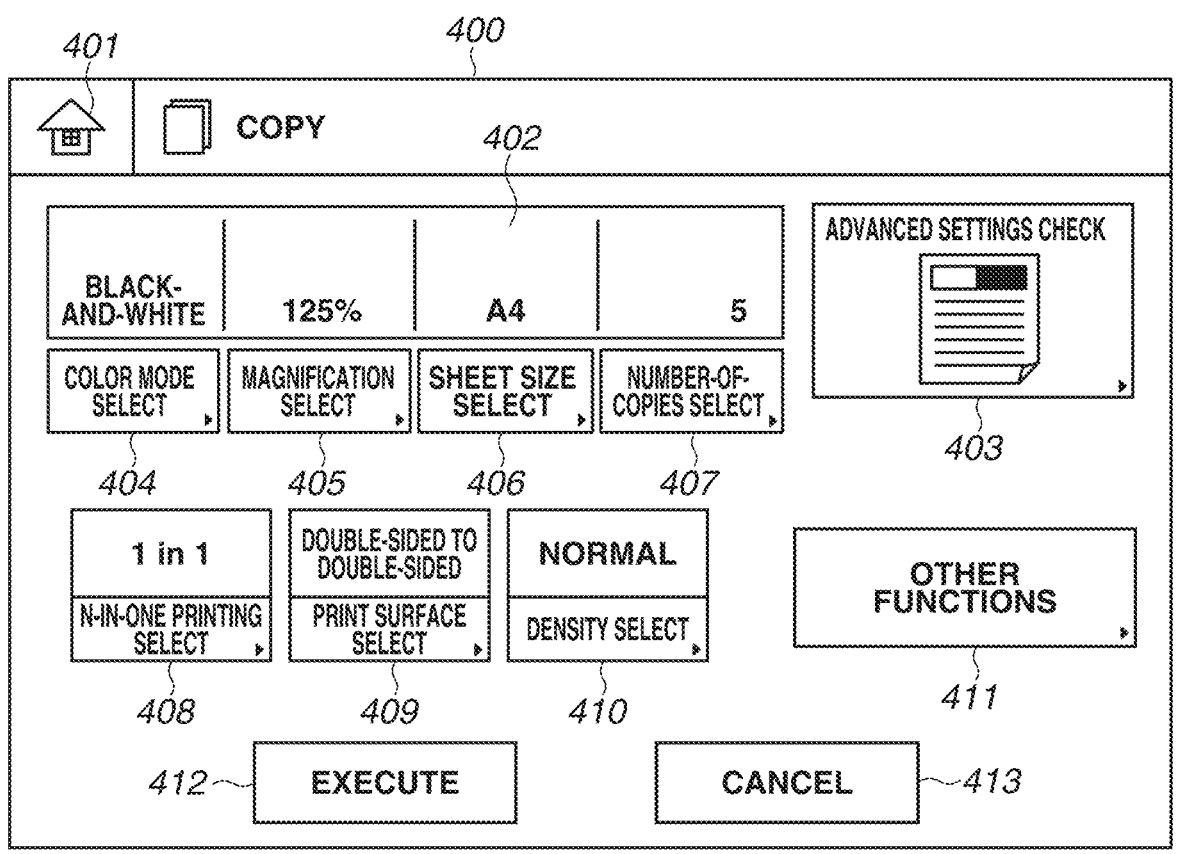
FIG. 4 illustrates an example of a details screen.

In step S503, the job execution unit 1607 reads out setting values of various settings from the received setting contents 304, and causes the input/output management unit 1608 to display the read setting values and setting items corresponding to the setting values. FIG. 4 illustrates a details screen 400 as an example of the screen displayed in this case.

The details screen 400 will now be described. A home button 401 is a button for returning to the home screen when the home button 401 is pressed. A setting value display area 402 is an area in which setting values for the color mode, the magnification, the sheet size, and the number of copies are displayed. An advanced settings check button 403 is a button for representing the current setting in preview. When the advanced settings check button 403 is pressed, a details check screen 600 is displayed. Setting selection buttons 404 to 407 are buttons for setting the color mode, the magnification, the sheet size, and the number of copies, respectively. In upper portions of setting display/selection buttons 408 to 410, setting values for N-in-one printing, print surface, and density, are displayed, respectively, and in lower portions of the setting display/selection buttons 408 to 410, these settings are made. An other-functions button 411 is a button for displaying a screen (not illustrated) for making other settings (e.g., stapling setting). An execution button 412 is a button for starting the execution of a job when the execution button 412 is pressed. A cancel button 413 is a button for closing the details screen 400 when the cancel button 413 is pressed.

Referring again to FIG. 5, in step S504, the input/output management unit 1608 determines whether pressing of the execution button 412 on the details screen 400 is detected. If pressing of the execution button 412 is not detected (NO in step S504), the processing proceeds to step S505. In step S505, the input/output management unit 1608 determines whether pressing of the cancel button 413 on the details screen 400 is detected. If it is determined that pressing of the cancel button 413 is detected (YES in step S505), the processing proceeds to step S507. If it is determined that pressing of the cancel button 413 is not detected (NO in step S505), the processing returns to step S504.

When the execution button 412 is pressed, in step S506, the job execution unit 1607 executes the job based on the print setting displayed on the details screen 400, and the input/output management unit 1608 displays the home screen 200, and a series of flow is terminated. The processing in the flowchart illustrated in FIG. 5 has been described above.

Figure 5:
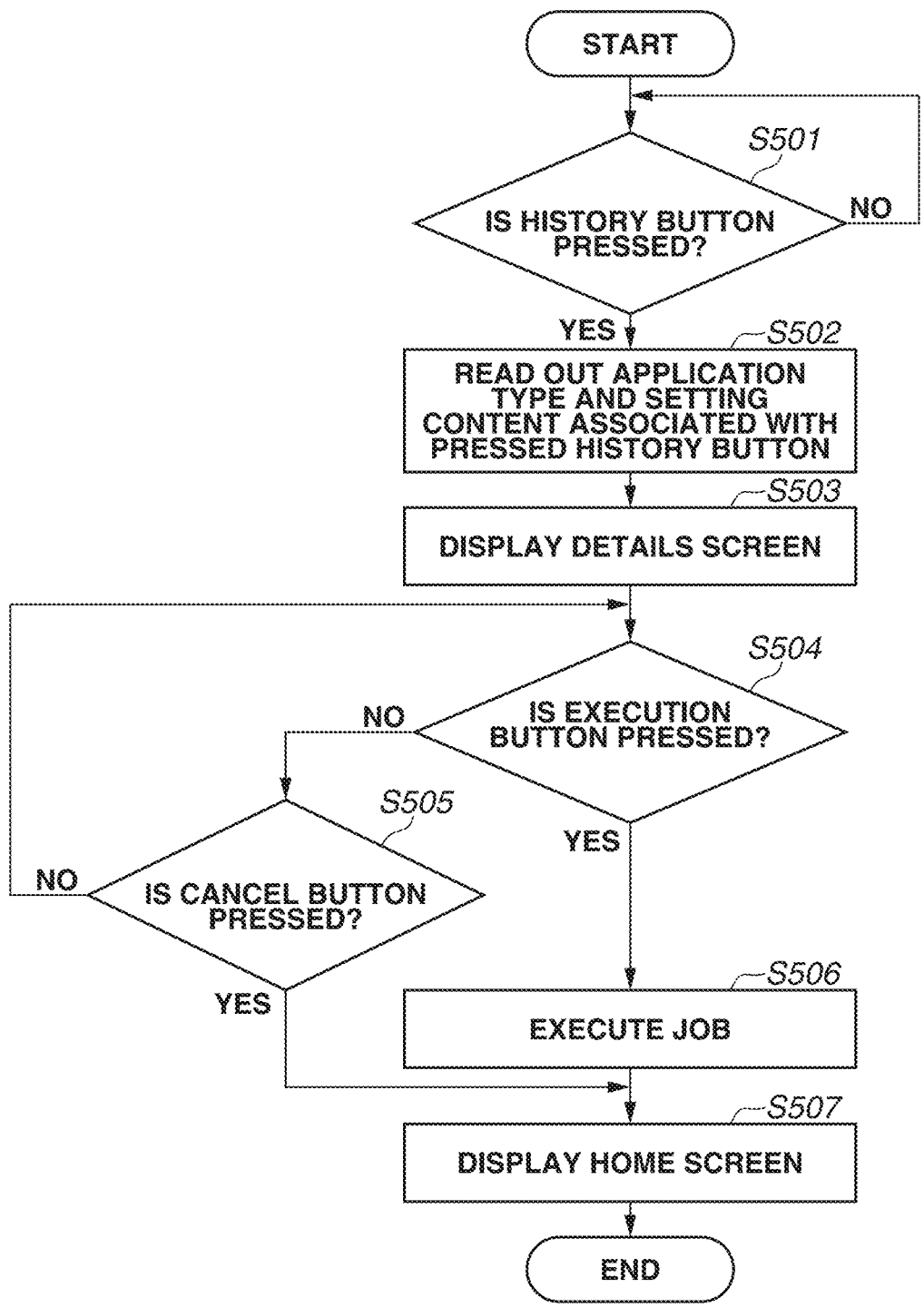
FIG. 5 is a flowchart illustrating an operation flow of processing from when a history button is pressed until when a job is executed.

In addition, when any one of the application buttons 202 to 206 is pressed instead of pressing any one of the history buttons, processing that is substantially the same as the flowchart illustrated in FIG. 5 is executed. This processing differs from the processing illustrated in FIG. 5 in that the processing for determining whether any one of the application buttons is pressed is performed as processing corresponding to steps S501 to S502. In this case, assume that the application button 202 is pressed. As processing corresponding to step S503, the details screen 400 is displayed. Subsequent processing, such as pressing of the execution button 412 and pressing of the cancel button 413, are similar to steps S504 to S507.

<Setting Screen in Skip Mode>

FIG. 5 illustrates a mode (normal mode) in which when any one of the history buttons 208 to 211 is pressed, the details screen 400 is displayed and the job is executed when the execution button 412 is pressed. Another method for executing a job can also be employed in the skip mode instead of the normal mode. The skip mode is a mode in which a job is executed without displaying the details screen 400 when any one of the history buttons 208 to 211 is pressed.

Figure 7:
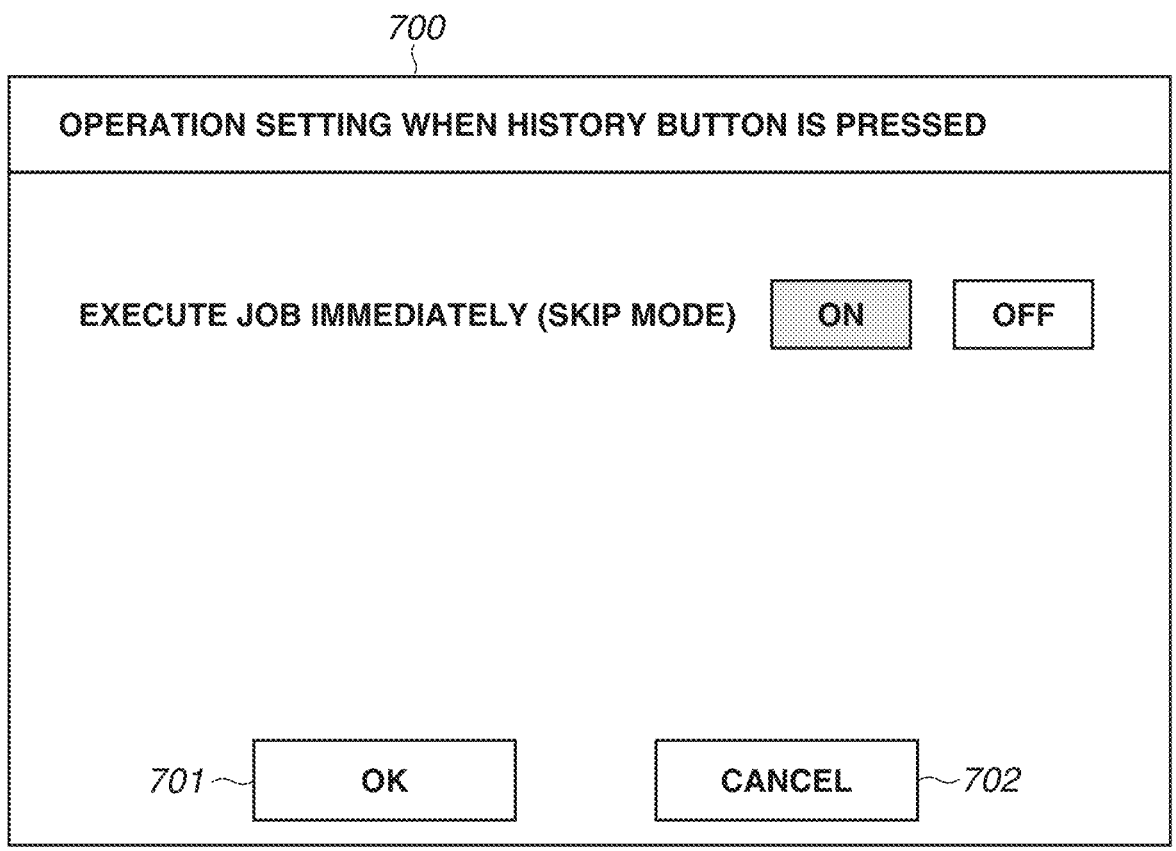
FIG. 7 illustrates an example of an operation setting screen when a history button is pressed.

FIG. 7 illustrates an operation setting screen 700 for setting the skip mode. The operation setting screen 700 is located within a setting menu (not illustrated) for making various settings for the MFP 101. In this case, the skip mode on the operation setting screen 700 is simultaneously set to all the history buttons 208 to 211. Alternatively, a mode in which a setting for turning on or off the skip mode is made for each of the history buttons 208 to 211 can be employed.

When an OK button 701 is pressed, the setting value (ON or OFF) for the skip mode is written into the ROM 113 or the RAM 112. When a cancel button 702 is pressed, the operation setting screen 700 is closed. The setting screen for setting the skip mode has been described above.

<Job Execution Flow in Skip Mode>

Figure 8:
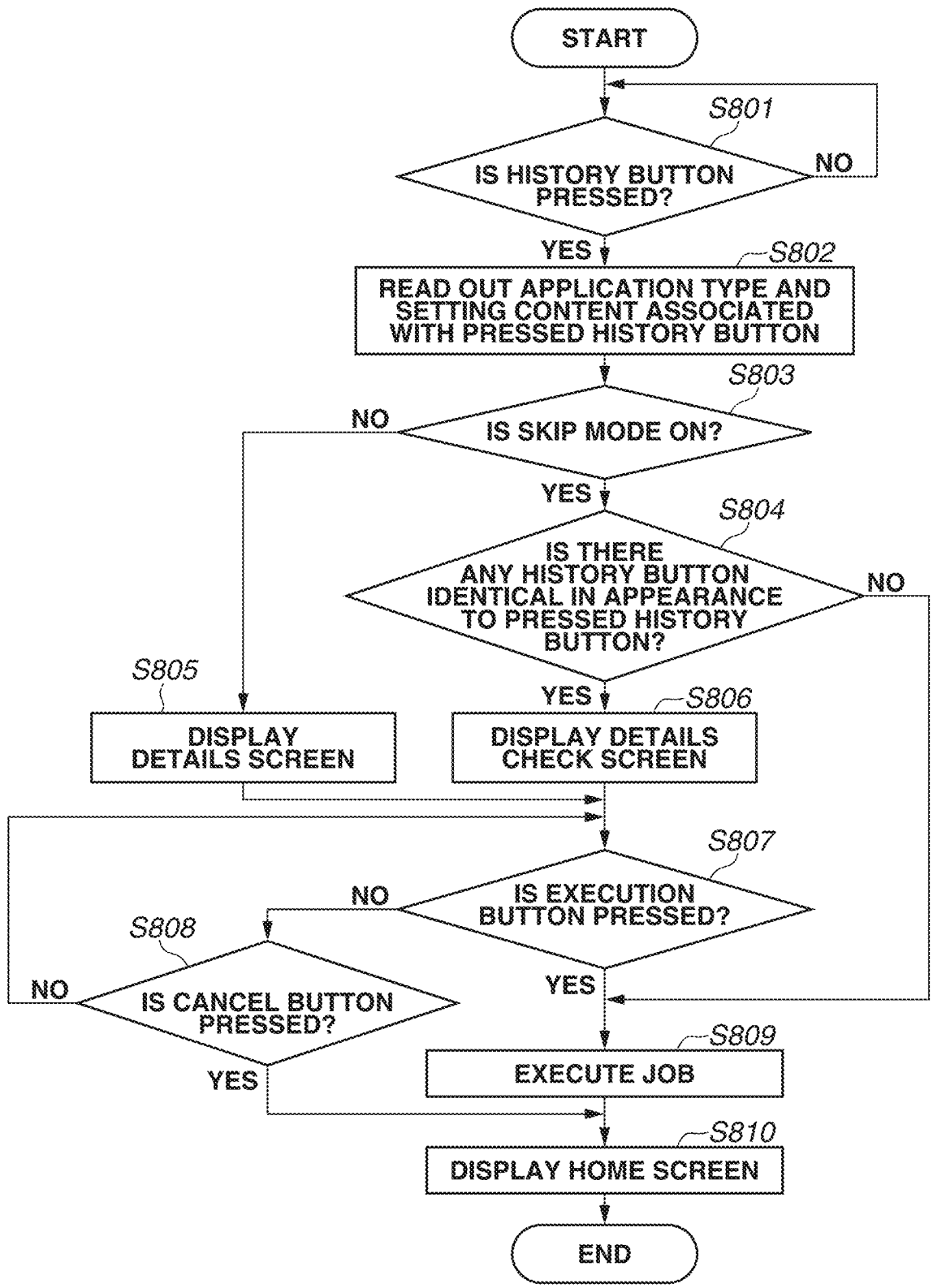
FIG. 8 is a flowchart illustrating an operation flow of processing from when a history button is pressed until when a job is executed according to the first exemplary embodiment.

FIG. 8 is a flowchart illustrating an operation flow of processing from when any one of the history buttons 208 to 211 is pressed until when a job is executed under a state where the skip mode "ON" is set to the MFP 101. This operation flow is executed in such a manner that the CPU 111 controls the program that is related to record pressing processing and stored in the ROM 113, upon receiving a notification indicating that pressing of any one of the history buttons 208 to 211 is detected from the touch panel 118. The CPU 111 repeatedly performs this operation flow at predetermined intervals (e.g., every one second) during a period in which a power supply of the MFP 101 is activated.

In step S801, the input/output management unit 1608 determines whether pressing of any one of the history buttons 208 to 211 is detected. The processing of step S801 is repeated until it is determined that pressing of any one of the history buttons 208 to 211 is detected. If it is determined that pressing of any one of the history buttons 208 to 211 is detected (YES in step S801), the processing proceeds to step S802.

In step S802, the input/output management unit 1608 reads out the setting contents 304 of the history associated with the pressed one of the history buttons 208 to 211. Then, the setting contents 304 are transmitted to the application that matches the read application type 302. In the present case, the history button 208 is pressed and the setting contents 304 corresponding to the history ID "1" are transmitted to the job execution unit 1607.

In step S803, the information management unit 1609 determines whether the skip mode is ON. If it is determined that the skip mode is ON (YES in step S803), the processing proceeds to step S804. If it is determined that the skip mode is OFF (NO in step S803), the processing proceeds to step S805. In step S805, the details screen 400 is displayed like in the normal mode.

In step S804, the information management unit 1609 determines whether there is any history button identical in appearance to the pressed history button.

Specifically, the displayed setting items in the setting contents 304 corresponding to the history button 208 pressed in this case are specified. In the present case, the application type 302 associated with the history button 208 is "copy". Accordingly, as seen from the table 1500, "the number of copies", "color mode", "sheet size", and "magnification" are displayed on the history button area 212.

Referring again to the history information 300, the information management unit 1609 determines whether there is any history button to which the same setting value as the history button 208 is set in the displayed setting items. The history information 300 indicates that the setting values in the setting items of "the number of copies", "color mode", "sheet size", and "magnification" for the history ID "2" are the same as those for the history ID "1", that is, the setting values of "5", "black-and-white", "A4", and "125%" are set for both the history ID "1" and the history ID "2". In other words, as a result of step S804, it is determined that the history button corresponding to the history ID "2" is identical in appearance to the pressed history button 208.

If it is determined that there is no history button identical in appearance to the pressed history button in step S804 (NO in step S804), the processing proceeds to step S809. In step S809, the job is executed. On the other hand, if there is a history button identical in appearance to the pressed history button (YES in step S804), the processing proceeds to step S806. In step S806, the screen display unit 1606 displays the details check screen 600. A form of the display screen to be displayed when there are history buttons identical in appearance is not particularly limited. For example, the details screen 400 may be displayed like in the normal mode.

FIG. 6 illustrates an example of the details check screen 600 to be displayed in step S806. In the present case, the setting contents of the history button specified by the history ID "1" are displayed. As the setting contents to be displayed in this case, all items of the setting contents 304 managed by the history information 300 may be displayed, or only specific setting items may be displayed. Although the present exemplary embodiment illustrates an example in which the history button 208 is pressed, when the history button 209 is pressed in step S801, the setting contents displayed in step S806 correspond to the setting contents 304 specified by the history ID "2".

The details screen 400 to be displayed in the normal mode differs from the details check screen 600 to be displayed in the skip mode in that the details screen 400 is configured such that the setting values in each setting item can be changed, while the details check screen 600 is configured such that the setting values in each setting item cannot be changed and the setting values can only be presented to the user. This is because there is a possibility that the user who wishes to set the skip mode may not wish to display the details screen 400 for changing the setting items after the history button is selected. Accordingly, only in the case where the skip mode is set and there are history buttons identical in appearance, the details check screen 600 is displayed to prompt the user to check the setting contents and seek the user's attention. At least some of the setting items and some of the setting values corresponding to the setting items are displayed on the details check screen 600 illustrated in FIG. 6. However, the configuration of the details check screen 600 is not limited to the example. Like the advanced settings check button 403 on the details screen 400, a preview in which the setting contents are reflected may also be displayed simultaneously.

Alternatively, since the details check screen 600 has a function for prompting the user to check the setting contents, only the preview of the advanced settings check button 403 may be displayed on the details check screen 600.

Referring again to FIG. 8, in step S807, the input/output management unit 1608 determines whether an execution button 602 is pressed. If it is determined that the execution button 602 is not pressed (NO in step S807), the processing proceeds to step S808. In step S808, the input/output management unit 1608 determines whether a cancel button 603 is pressed. If it is determined that the cancel button 603 is pressed (YES in step S808), the details check screen 600 is closed and then the processing is terminated. If it is determined that the execution button 602 is pressed, in step S810, the job corresponding to the history button pressed in step S801 is executed. In the present case, the function corresponding to the history button 208 is executed. After the function is executed, in step S810, the home screen 200 is displayed, and then the processing is terminated.

In the history information 300 illustrated in FIG. 3, as an example, the setting values in the setting items of the number of copies, color mode, sheet size, magnification, density, and stapling in the setting contents 304 for the history ID "1" are the same as those for the history ID "2", and the setting values in the setting items of the print surface and N-in-one printing for the history ID "1" are different from those for the history ID "2". The setting items with different setting values are not displayed on the history button area (table 1500). Accordingly, the setting items other than the previous execution date/time 303 of the history button 208 are the same as those of the history button 209, which makes it almost impossible for the user to discriminate the history button 208 from the history button 209.

However, according to the present exemplary embodiment, when one of the history button 208 and the history button 209, which are identical in appearance, is pressed, the details check screen 600 is displayed to thereby enable the user to check the setting contents that are not displayed on the history button area. While the present exemplary embodiment illustrates a mode in which two history buttons that are identical in appearance are displayed, the same configuration as described above can be applied even when three or more history buttons are displayed.

The first exemplary embodiment illustrates a mode in which, as illustrated in FIG. 8, the details check screen 600 is displayed when the skip mode is ON and a plurality of history buttons identical in appearance is present. Further, when it is determined that there are no history buttons that are identical in appearance, the job is executed.

However, even when it is determined in step S804 that there are no history buttons identical in appearance, the history button selected by the user may be different from the user's intended setting. For example, if the setting contents that are not displayed on the history button area 214 are different from the default settings, the user may unintentionally press the history button 210 even when the user intends to execute the job with the default settings.

Accordingly, a second exemplary embodiment illustrates a mode in which, when the setting contents that are not displayed on the history button area are different from the default settings, a check screen is displayed to prevent the user from executing a job with unintended settings. Descriptions of the modes described above in the first exemplary embodiment will be omitted.

Figure 9:
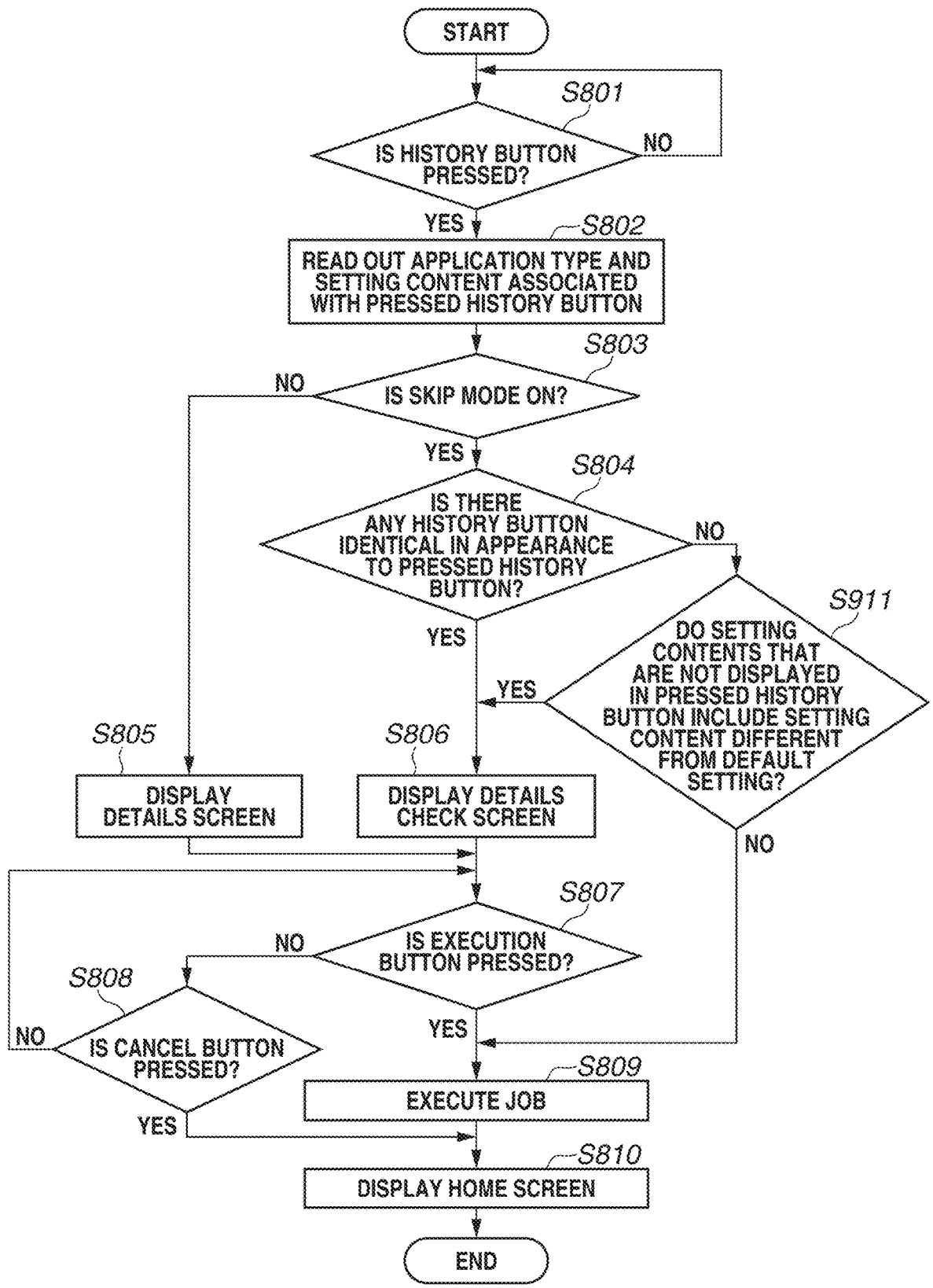
FIG. 9 is a flowchart illustrating an operation flow of processing from when a history button is pressed until when a job is executed according to a second exemplary embodiment.

FIG. 9 is a flowchart illustrating an operation flow of processing from when any one of the history buttons 208 to 211 is pressed until when a job is executed according to the present exemplary embodiment. This operation flow is executed in such a manner that the CPU 111 controls the program that is related to record pressing processing and stored in the ROM 113, upon receiving a notification indicating that pressing of any one of the history buttons 208 to 211 is detected from the touch panel 118. The CPU 111 repeatedly performs this operation flow at predetermined intervals (e.g., every one second) during a period in which the power supply of the MFP 101 is activated.

In step S804, if it is determined that there is no history button that is identical in appearance to the pressed history button (NO in step S804), the processing proceeds to step S911. In step S911, the information management unit 1609 determines whether setting contents that are not displayed on the history button area of the pressed history button include setting contents different from the default settings.

Specifically, the information management unit 1609 refers to the history information 300 managed by the information management unit 1609 to specify the setting contents corresponding to the pressed history button. In the present case, assuming that the history button 210 is pressed, the setting contents 304 corresponding to the history button 210 (history ID "3") are identified in step S804. By referring to the table 1500, the setting items that are not displayed on the history button area 214 in the setting contents are identified. In the present case, for example, the setting items of "print surface", "N-in-one printing", "density", and "stapling" are not displayed.

After identifying the setting items that are not displayed, a default setting 1000 (FIG. 10) of the setting contents 304 is referenced. Herein, the default setting 1000 is not particularly limited, and may be, for example, factory default values in each setting item, personalized default setting values for individuals, or default setting values collectively set by an administrator. By referring to the default setting 1000, the information management unit 1609 identifies the setting item having a setting value different from the default setting among the setting items that are not displayed.

In this example, it can be seen that the setting content "density" corresponding to the history ID "3" is changed from "normal" in the default setting to "dense" in the history information 300. Accordingly, in step S911, it is determined that there is a setting item having a setting value that is different from the default setting (YES in step S911), and the processing proceeds to step S806. The processing according to the present exemplary embodiment has been described above.

According to the present exemplary embodiment, even when the setting contents that are not displayed on the history button area are different from the default settings, the check screen is displayed to make it possible to prevent a job from being executed with settings unintended by the user.

The first and second exemplary embodiments illustrate a mode in which the details check screen 600 is displayed when there is a history button identical in appearance to the pressed history button. A third exemplary embodiment illustrates another form of the details check screen 600. Processing for displaying the details check screen is basically the same as the processing according to the first exemplary embodiment illustrated in FIG. 8, and thus the description thereof is omitted. The present exemplary embodiment also illustrates an example in which the history button 208 is pressed.

Figure 11:
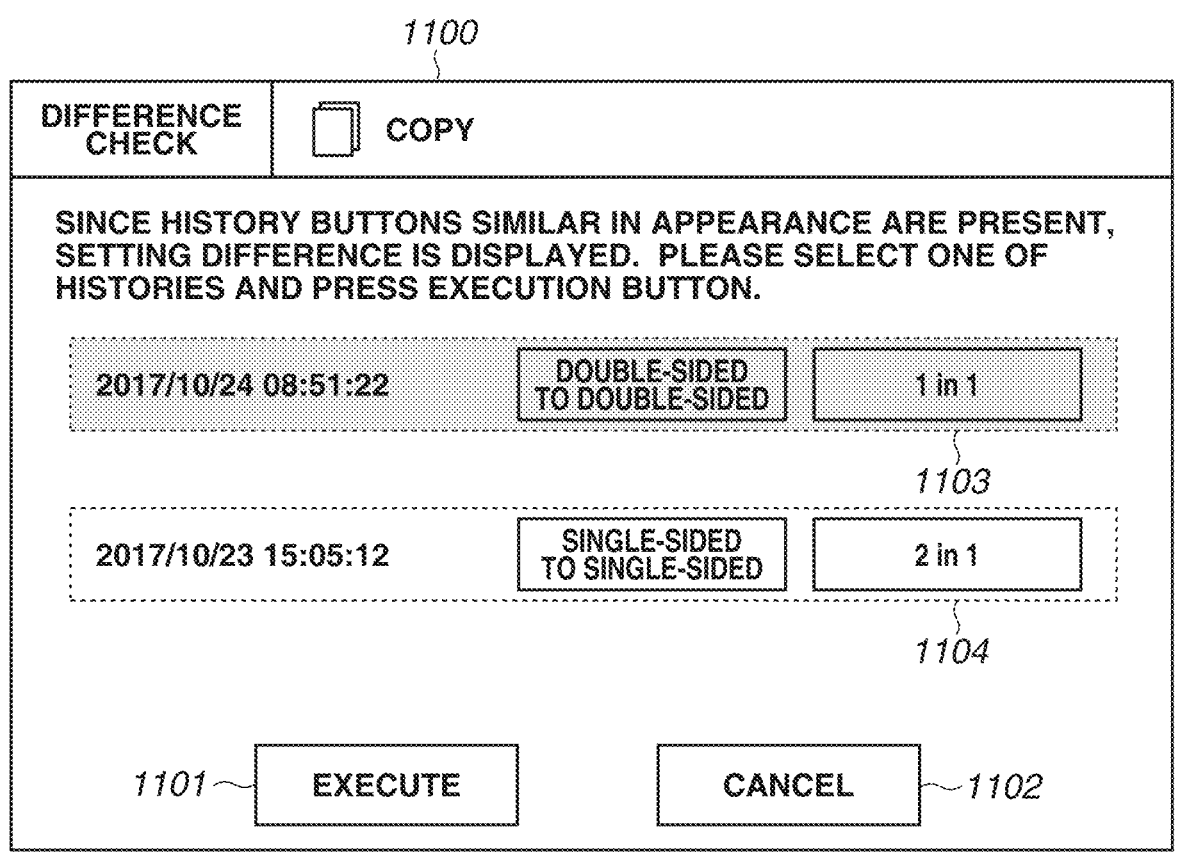
FIG. 11 illustrates an example of a difference check screen.

FIG. 11 illustrates a difference check screen 1100 which is displayed when the history button 208 is pressed, and is displayed in step S806 in place of the details check screen 600 according to the first exemplary embodiment. The difference check screen 1100 is displayed also when the history button 209 that is identical in appearance to the history button 208 is pressed.

On the difference check screen 1100, the difference between the setting values corresponding to the history buttons (208 and 209) that are determined to be identical in appearance in step S804 is displayed. Specifically, only the setting items of "print surface" and "N-in-one printing" with different setting values are displayed among the setting contents 304 corresponding to the history button 208 (history ID "1") and the setting contents 304 corresponding to the history button 209 (history ID "2"). FIG. 11 illustrates not only the different print setting, but also the date and time when each job has been executed.

The user can check the difference between the setting values of the plurality of history buttons on the difference check screen 1100, and can select a desired setting content and execute the job. Specifically, if the user wishes to execute the job with the setting contents ("double-sided to double-sided" "1 in 1") corresponding to the history ID "1", the user selects a button 1103 and press an execution button 1101. When the execution button 1101 is pressed, the input/output management unit 1608 reads out the application type 302 and the setting contents 304 associated with the button selected on the difference check screen 1100. Then, the setting contents 304 are transmitted to the job execution unit 1607, and the job is executed. In the present case, the setting contents 304 are transmitted to the job execution unit 1607.

The button corresponding to the selected setting content is highlighted (for example, the button is displayed in color) as illustrated in FIG. 11. On the other hand, when a cancel button 1102 is pressed regardless of whether the button 1103 or a button 1104 is pressed, the difference check screen 1100 is closed without executing the job.

Similarly, when there are three or more history buttons that are identical in appearance, different setting contents corresponding to the number of the history buttons are displayed on the difference check screen 1100. While the present exemplary embodiment illustrates a form in which all different setting contents are displayed on the difference check screen 1100, the present disclosure is not limited to this form. For example, if the setting contents of four setting items, "print surface", "N-in-one printing", "density", and "stapling", are different among the history buttons, priorities may be provided to the four setting items and only the setting item with a highest priority may be displayed as a setting difference. The difference check screen 1100 according to the present exemplary embodiment is configured as described above.

According to the configuration of the present exemplary embodiment, if there is a plurality of history buttons identical in appearance, the setting values are compared to detect a difference therebetween, and then a desired setting value can be selected and a job can be executed. Thus, even when the history button that does not correspond to the desired setting content is selected in step S801, the desired content can be re-selected on the difference check screen 1100 displayed in step S806.

The mode in which the details check screen 600 or the difference check screen 1100 is displayed may be troublesome for the user who has accurately recognized the setting contents 304 that are not displayed on the history button area. A fourth exemplary embodiment illustrates a setting in which a job is executed immediately without displaying the details check screen 600 or the difference check screen 1100. Components identical to those in the first to third exemplary embodiments are denoted by the same reference numerals, and detailed descriptions thereof are omitted.

FIG. 12 illustrates an example of a details check screen 1200 according to the present exemplary embodiment. A checkbox 1204 is a checkbox for making a setting for preventing the details check screen 1200 from being displayed even when the history button 208 that has been pressed immediately before the details check screen 1200 is displayed is pressed again.

The setting value (ON or OFF) of the checkbox 1204 is associated with the history ID 301 of each history button and is stored in the ROM 113 or the RAM 112. In the present case, when the checkbox 1204 is set to "ON" and an execution button 1202 is pressed, the job is executed by the job execution unit 1607, and the setting value of the checkbox 1204 and the history ID "1" are associated with each other and managed by the information management unit 1609.

When a cancel button 1203 is pressed, the details check screen 1200 is closed without writing the setting value of the checkbox 1204 into the ROM 113 or the RAM 112, or executing the job.

Figure 13:
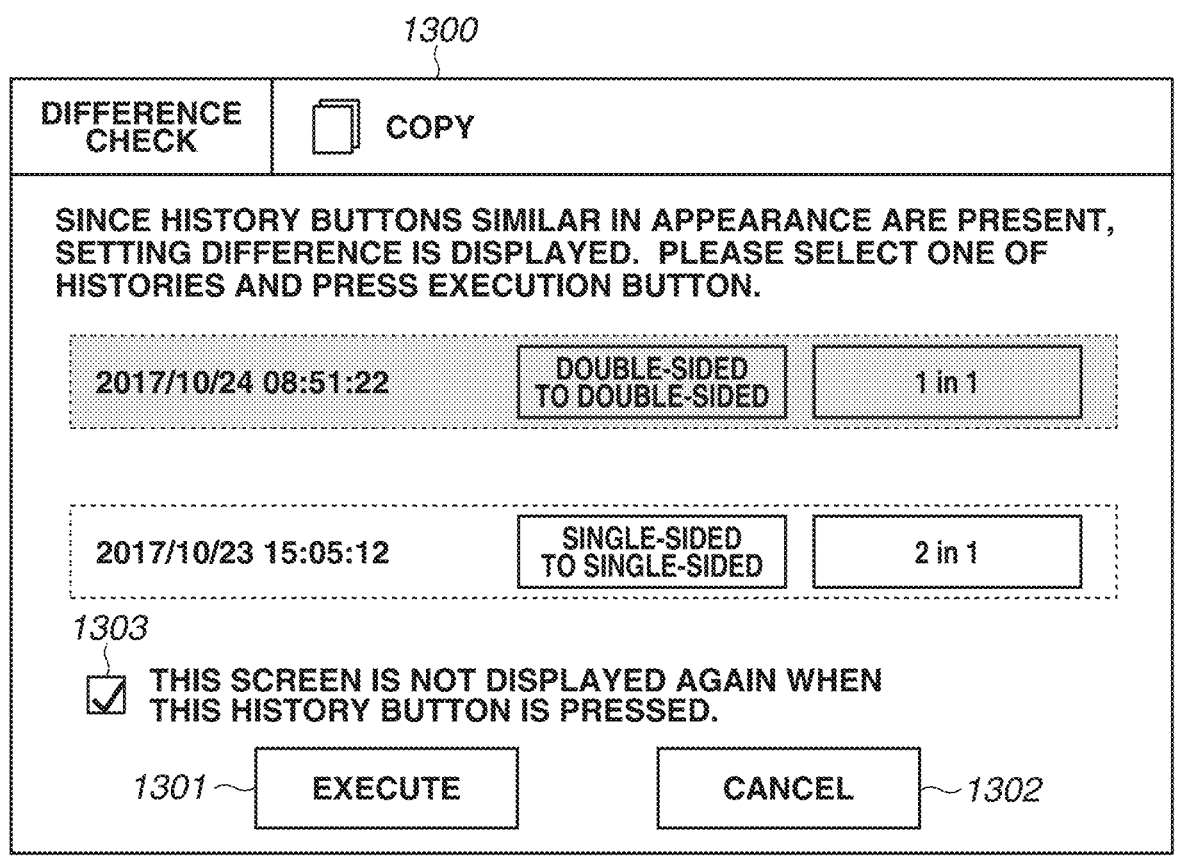
FIG. 13 illustrates an example of the difference check screen including a checkbox.

FIG. 13 illustrates an example of a difference check screen 1300 according to the present exemplary embodiment. A checkbox 1303 is a checkbox for making a setting for preventing the difference check screen 1300 from being displayed even when the history button 208 that has been pressed immediately before the difference check screen 1300 is displayed is pressed again.

The setting value (ON or OFF) of the checkbox 1303 is associated with the history ID 301 of each history button and is stored in the ROM 113 or the RAM 112. The storage of the setting value of the checkbox 1303 is triggered by pressing of an execution button 1301. Similarly to the details check screen 1200, a cancel button 1302 may be pressed to cancel the storing processing.

However, in the case of the difference check screen 1300, the method for associating the history ID with the setting value of the checkbox is not limited to this example. In the case of the difference check screen 1300, setting contents corresponding to a plurality of history buttons are displayed. Accordingly, the setting value of the checkbox 1303 may be associated with all history IDs of the displayed history buttons.

An operation flow of processing from when a history button is pressed until when a job is executed according to the present exemplary embodiment will be described with reference to FIG. 14. This operation flow includes determination of display or non-display, and control operation on the details check screen 1200, based on the setting value of the checkbox 1204. This operation flow is executed in such a manner that the CPU 111 controls the program that is related to the record pressing processing and stored in the ROM 113, upon receiving a notification indicating that any one of the history buttons 208 to 211 is pressed from the touch panel 118. The CPU 111 repeatedly performs this operation flow at predetermined intervals (e.g., every one second) during a period in which the power supply of the MFP 101 is activated. The processes described before are denoted by the same reference symbols, and descriptions thereof are omitted.

In step S804, it is determined that there is a history button that is identical in appearance to the pressed history button (YES in step S804), the processing proceeds to step S1401. In step S1401, the information management unit 1609 reads out the setting value set by the checkbox 1204, which is associated with the history button pressed in step S801, from the ROM 113 or the RAM 112.

In step S1402, the information management unit 1609 determines whether the setting value set by the checkbox 1204 is ON. If it is determined that the setting value is ON (YES in step S1402), the details check screen 1200 is not displayed. If it is determined that the setting value is OFF (NO in step S1402), the processing proceeds to step S806. In step S806, the job is executed without displaying the details check screen 1200.

Figure 14:
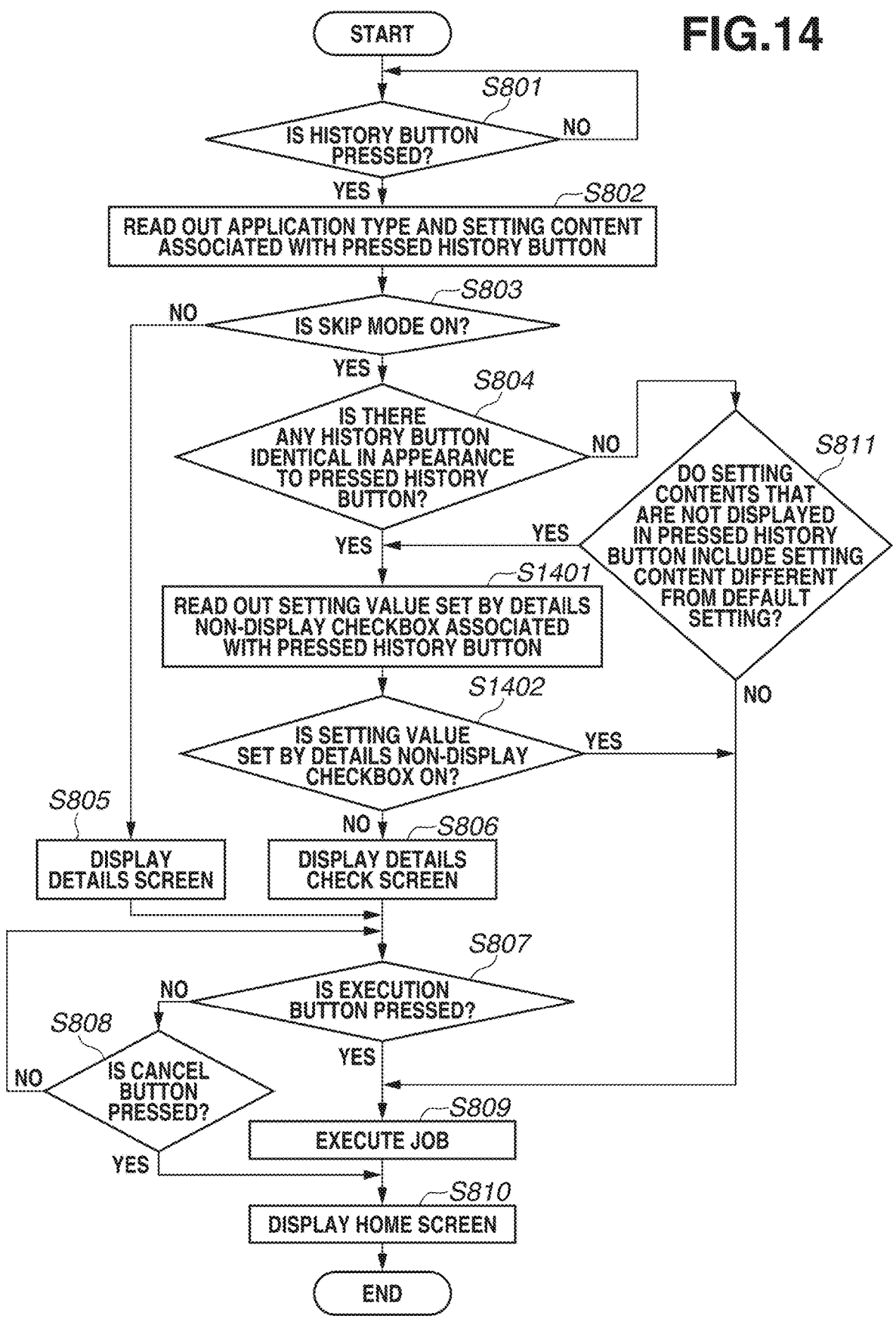
FIG. 14 is a flowchart illustrating an operation flow of processing from when a history button is pressed until when a job is executed according to a fourth exemplary embodiment.

Processing for checking the setting of the checkbox 1303 on the difference check screen 1300 is similar to that illustrated in FIG. 14, and thus the description thereof is omitted.

Display or non-display of the details check screen 600 or the difference check screen 1100 can be set with the configuration according to the present exemplary embodiment described above. Processing for resetting the setting value for each checkbox, such as resetting of the setting value for the checkbox 1204 or the checkbox 1303 when the power supply of the MFP 101 is turned off, or resetting of the setting value based on a user's log-off operation on the MFP 101 that requires user's authentication, may be provided.

Other Exemplary Embodiments

In step S804 according to the first exemplary embodiment, by referring to the table 1500, it is determined whether there is a plurality of history buttons identical in appearance, only for the setting items displayed on the history button area and the setting values corresponding to the setting items. However, the present disclosure is not limited to this method. The method is not limited to display or non-display of each setting item, but instead a method in which all setting items of the setting contents 304 are compared for the determination may be employed. Further, not only the setting contents 304, but also the application type 302 may be included in the determination references.

In step S911 according to the second exemplary embodiment, a mode is described in which the setting contents that are not displayed among the setting contents are identified and the setting values corresponding to the setting contents that are not displayed are compared with the default settings. However, the present disclosure is not limited to this mode. For example, it is possible to employ a method in which all setting items included in the setting contents are compared with the default settings and it is determined whether the setting items having setting different values from the default settings are not displayed, by referring to the table 1500. That is, a sequence of referencing the table 1500 in each of the exemplary embodiments is not particularly specified.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-116496, filed Jun. 19, 2018, which is hereby incorporated by reference herein in its entirety.

What is claimed is:

1. An image processing apparatus that includes a plurality of functions of the image processing apparatus and arranges a first software key for activating one of the plurality of the functions in a first area displayed on a display of the image processing apparatus, the display being configured to display a second area in which at least a second software key generated in response to executing a job using one of the functions is arranged, the image processing apparatus comprising:
at least one processor configured to cause the image processing apparatus to function as:
a display control unit configured to display a part of a setting content of the second software key on the second software key; and
a setting unit configured to set a mode for executing, by pressing the second software key, a function based on the setting content of the pressed second software key, without displaying a first screen with which the setting content of the pressed second software key is changeable,
wherein in a case where the mode is set by the setting unit, and the part of the setting content displayed on the pressed second software key is identical with a part of a setting content displayed on another second software key, a second screen is displayed to indicate the setting content corresponding to the pressed second software key.

2. The image processing apparatus according to claim 1,
wherein the setting content of the preliminarily used function includes a setting item for using the function and a setting value set in the setting item, and
wherein the setting value corresponding to the second software key is different from a setting value corresponding to the third software key.

3. The image processing apparatus according to claim 2, wherein the at least one processor further causes the image processing apparatus to function as a management unit configured to manage a setting value to be displayed on one of the second software key and the third software key,
wherein based on the setting value managed by the management unit, the image processing apparatus determines whether a setting content identical to the setting content displayed on the second software key is displayed on the third software key.

4. The image processing apparatus according to claim 1,
wherein a part of setting contents for executing processing corresponding to the second software key are displayed on the second software key, and
wherein some of setting contents for executing processing corresponding to the third software key are displayed on the third software key.

5. The image processing apparatus according to claim 1, wherein the second screen displays at least a setting content corresponding to a difference between the setting content of the pressed second software key and the setting content of the third software key on which the setting content identical to the setting content displayed on the second software key is displayed.

6. The image processing apparatus according to claim 5, wherein the second screen includes:
a first display area which displays a setting content different from a setting content of the third software key among the setting contents of the second software key, is displayed; and
a second display area which displays a first setting content different from the setting content of the second software key, among the setting content of the third software key,
wherein when one of the first display area and the second display area is pressed, the function is executed based on the setting content corresponding to the pressed display area.

7. The image processing apparatus according to claim 1, wherein in a case where the setting content identical to the setting content displayed on the pressed second software key is not displayed on the third software key, the at least one processor further causes the image processing apparatus to function as a determination unit configured to determine whether a setting value different from a default setting is present among setting values included in setting contents that are not displayed on the second software key, and
wherein the second screen is displayed in a case where the determination unit determines that the setting value is present.

8. The image processing apparatus according to claim 1, wherein the second screen includes a checkbox for making a setting for preventing the second screen from being displayed when the second software key is pressed next time and thereafter.

9. The image processing apparatus according to claim 1, wherein the function includes at least one of a print function for executing print processing, a facsimile function for executing facsimile processing, a scan function for executing scan processing, and a storage function for storing text data in a specific folder in the image processing apparatus.

10. A method for controlling an image processing apparatus that includes a plurality of functions of the image processing apparatus, the method comprising:
arranging a first software key for activating one of the plurality of the functions in a first area displayed on a display of the image processing apparatus,
wherein the display displays a second area in which at least a second software key generated in response to executing a job using one of the functions is engaged,
displaying a part of a setting content of the second software key on the second software key,
wherein the image processing apparatus sets a mode for executing, by pressing the second software key, a function based on the setting content of the pressed second software key without displaying a first screen with which the setting content of the pressed second software key is changeable, and
wherein in a case where the mode is set and the part of the setting content displayed on the pressed second software key is identical with a part of a setting content displayed on another second software key, a second screen is displayed to indicate the setting configured to check a setting content corresponding to the pressed second software key is displayed.

11. A non-transitory storage medium storing instructions that when executed by one or more processors controls the one or more processors to operate as a program for functioning as an image processing apparatus that includes a plurality of functions of the image processing apparatus and arranges a first software key for activating one of the plurality of the functions in a first area displayed on a display of the image processing apparatus,
wherein the display displays a second area in which at least a second software key generated in response to executing a job using one of the functions is arranged,
wherein the image processing apparatus is configured to function as:
a display control unit configured to display a part of a setting content of the second software key on the second software key; and
a setting unit configured to set a mode for executing, by pressing the second software key, a function based on the setting content of the pressed second software key, without displaying a first screen with which the setting content of the pressed second software key is changeable, and
wherein in a case where the mode is set by the setting unit and the part of the setting content displayed on the pressed second software key is identical with a part of a setting content displayed on another second software key, a second screen is displayed to indicate the setting content corresponding to the pressed second software key.

* * * * *